(12) United States Patent
Ho

(10) Patent No.: US 11,170,925 B2
(45) Date of Patent: Nov. 9, 2021

(54) FLYWHEEL DEVICE WITH MAGNETICALLY FLOATING FUNCTION

(71) Applicant: Fu-Hung Ho, Taichung (TW)

(72) Inventor: Fu-Hung Ho, Taichung (TW)

( * ) Notice: Subject to any disclaimer, the term of this patent is extended or adjusted under 35 U.S.C. 154(b) by 91 days.

(21) Appl. No.: 16/832,341

(22) Filed: Mar. 27, 2020

(65) Prior Publication Data
US 2021/0304939 A1 Sep. 30, 2021

(51) Int. Cl.
*F16F 15/315* (2006.01)
*F16C 39/06* (2006.01)
*F16C 32/04* (2006.01)
*H01F 7/20* (2006.01)

(52) U.S. Cl.
CPC .......... *H01F 7/202* (2013.01); *F16F 15/3156* (2013.01); *F16C 32/0431* (2013.01); *F16C 39/066* (2013.01)

(58) Field of Classification Search
CPC .. F16F 15/3156; F16F 15/315; F16F 15/3153; F16F 15/30; F16F 15/18; F16F 15/005; F16F 15/03; F16F 2222/06; F16C 32/0429; F16C 32/0427; F16C 32/0425; F16C 32/0423; F16C 32/0431; F16C 39/066; F16C 39/06; H01F 7/202; H02K 49/108; Y10T 74/2127
See application file for complete search history.

(56) References Cited

U.S. PATENT DOCUMENTS

| 8,864,439 | B2 * | 10/2014 | Williams | F16C 19/507 415/3.1 |
| 2007/0018459 | A1 * | 1/2007 | Williams | F16C 32/0431 290/54 |
| 2014/0260779 | A1 * | 9/2014 | Prober | H02K 7/025 74/572.11 |
| 2017/0146092 | A1 * | 5/2017 | Murphy | F16C 32/0431 |
| 2018/0323694 | A1 * | 11/2018 | Suk | H02N 11/00 |

FOREIGN PATENT DOCUMENTS

| JP | 55057716 A * | 4/1980 | .......... F16C 32/0427 |
| WO | WO-2020084345 A1 * | 4/2020 | .............. H02K 7/09 |

* cited by examiner

*Primary Examiner* — Daniel D Yabut
(74) *Attorney, Agent, or Firm* — Karin L. Williams; Alan D. Kamrath; Mayer & Williams PC

(57) ABSTRACT

A flywheel device includes a base, a cantilever mounted on the base, a bearing seat mounted on the base, first magnetic members mounted on the base, a rotation shaft arranged between the cantilever and the bearing seat, a magnetically floating seat mounted on the rotation shaft, second magnetic members mounted on the magnetically floating seat and corresponding to the first magnetic members, third magnetic members mounted on the magnetically floating seat, a repulsion driver locked on the base and surrounding the magnetically floating seat, fourth magnetic members mounted on the repulsion driver and corresponding to the third magnetic members, and a flywheel unit mounted on the rotation shaft. The second magnetic members have a polarity the same as that of the first magnetic members. The fourth magnetic members have a polarity the same as that of the third magnetic members.

8 Claims, 7 Drawing Sheets

FLYWHEEL DEVICE WITH MAGNETICALLY FLOATING FUNCTION

BACKGROUND OF THE INVENTION

1. Field of the Invention

The present invention relates to a flywheel (or swivel wheel or swinging wheel) device for a motor.

2. Description of the Related Art

A conventional working machine, such as a stamping machine, a press, an iron sheet cutter, a stone crusher or the like, uses a motor to transmit a torque. The motor is provided with a flywheel which is driven by the motor. The flywheel is revolved to produce a required torque by the rotational inertia of the flywheel, so as to compensate or complement the insufficient torque of the motor. However, the conventional flywheel has a heavier weight and has a greater friction coefficient during rotation, such that the flywheel need a larger electricity consumption. In the practical test, when the flywheel unit 70 is operated at 550 rpm, the consumed power of the motor is 860 W. Thus, the consumed electricity required for driving the motor 90 is too large.

BRIEF SUMMARY OF THE INVENTION

The primary objective of the present invention is to provide a flywheel device with a magnetically floating (or levitating) function.

In accordance with the present invention, there is provided a flywheel device comprising a base, a cantilever mounted on a side of the base, a bearing seat mounted on a center of the base, a plurality of first magnetic members mounted on a top of the base, a rotation shaft arranged between the cantilever and the bearing seat, a magnetically floating seat mounted on the rotation shaft, a plurality of second magnetic members mounted on a bottom of the magnetically floating seat and corresponding to the first magnetic members, a plurality of third magnetic members mounted on a periphery of the magnetically floating seat, a repulsion driver locked on a periphery of the base and surrounding the magnetically floating seat, a plurality of fourth magnetic members mounted on the repulsion driver and corresponding to the third magnetic members, and a flywheel unit mounted on the rotation shaft and located above the magnetically floating seat. Each of the second magnetic members has a polarity the same as that of each of the first magnetic members to produce a repulsive force between the second magnetic members and the first magnetic members. Each of the fourth magnetic members has a polarity the same as that of each of the third magnetic members to produce a repulsive force between the fourth magnetic members and the third magnetic members when the magnetically floating seat is rotated.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
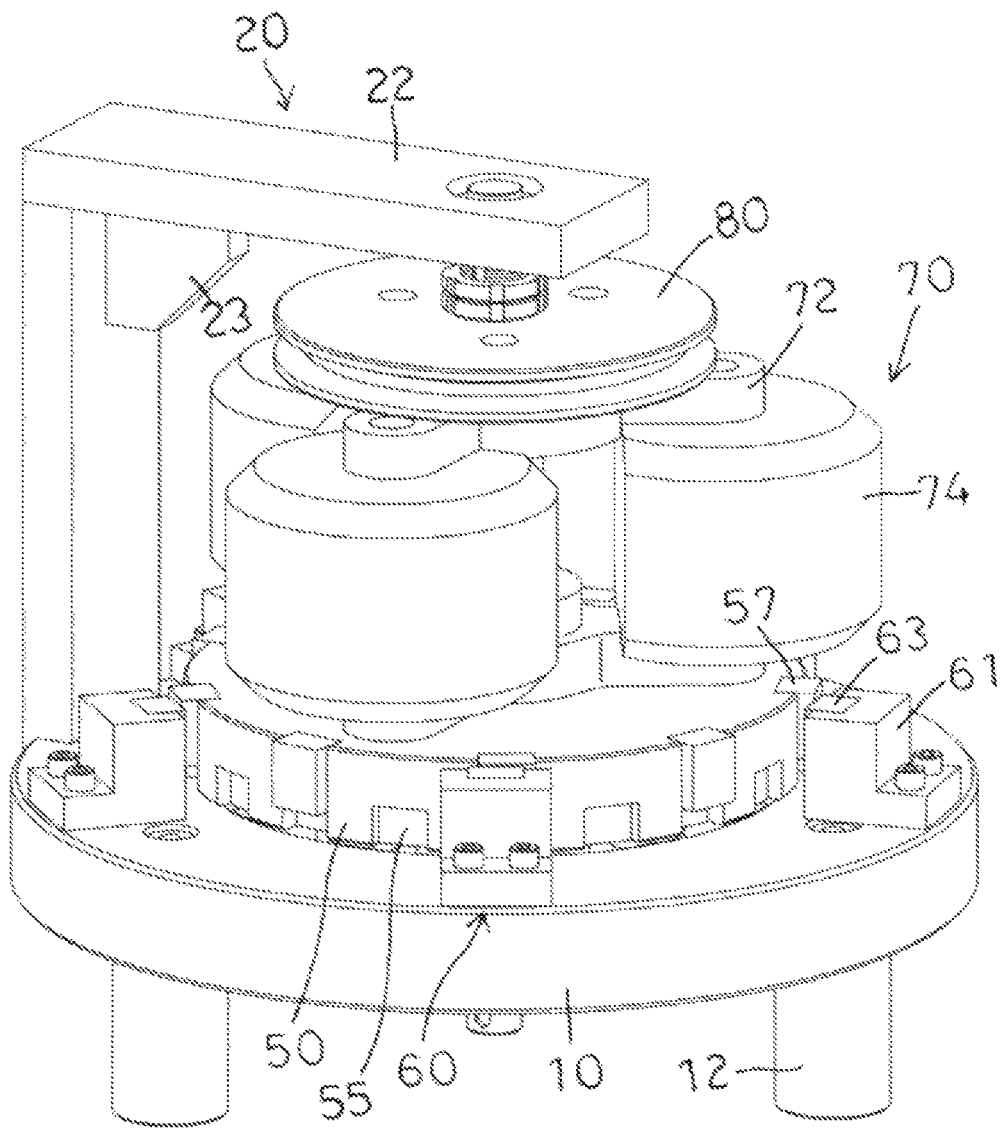
FIG. 1 is a perspective view of a flywheel device in accordance with the preferred embodiment of the present invention.

Referring to the drawings and initially to FIGS. 1-5, a flywheel device in accordance with the preferred embodiment of the present invention comprises a base 10, a cantilever (or suspension arm) 20 mounted on a side of the base 10, a bearing seat 30 mounted on a center of the base 10, a plurality of first magnetic members 18 mounted on a top of the base 10, a rotation shaft 40 arranged between the cantilever 20 and the bearing seat 30, a magnetically floating seat 50 mounted on the rotation shaft 40, a plurality of second magnetic members 55 mounted on a bottom of the magnetically floating seat 50 and corresponding to the first magnetic members 18, a plurality of third magnetic members 57 mounted on a periphery of the magnetically floating seat 50, a repulsion driver 60 locked on a periphery of the base 10 and surrounding the magnetically floating seat 50, a plurality of fourth magnetic members 63 mounted on the repulsion driver 60 and corresponding to the third magnetic members 57, and a flywheel unit 70 mounted on the rotation shaft 40 and located above the magnetically floating seat 50.

The top of the base 10 is provided with a first receiving groove 17 which has an annular shape and has an opening directed upward. The cantilever 20 has a substantially inverted L-shaped configuration and includes an upright portion 21, and a horizontal portion 22. The upright portion 21 of the cantilever 20 is secured to the base 10. An upper bearing B1 is mounted on the horizontal portion 22 of the cantilever 20. At least one lower bearing B2 is mounted on the bearing seat 30.

The rotation shaft 40 has an upper end 41 pivotally mounted on the upper bearing B1 and a lower end 42 pivotally mounted on the at least one lower bearing B2, such that the rotation shaft 40 is pivotally mounted between the cantilever 20 and the bearing seat 30. The rotation shaft 40 is provided with a positioning flange 45.

The magnetically floating seat 50 is located above the positioning flange 45 and spaced from the base 10, with a clearance being defined between the magnetically floating seat 50 and the base 10. The magnetically floating seat 50 has a center provided with a shaft hole 51 mounted on the rotation shaft 40. The shaft hole 51 has an inner diameter smaller than an outer diameter of the positioning flange 45, such that the shaft hole 51 of the magnetically floating seat 50 is positioned above the positioning flange 45 of the rotation shaft 40. The bottom of the magnetically floating seat 50 is provided with a plurality of second receiving grooves 54 corresponding to the first receiving groove 17. The periphery of the magnetically floating seat 50 is provided with a plurality of third receiving grooves 56 which are arranged between the second receiving grooves 54.

The repulsion driver 60 has a hollow interior receiving the magnetically floating seat 50. The repulsion driver 60 is provided with a plurality of fourth receiving grooves 62 corresponding to the third receiving grooves 56.

The flywheel unit 70 includes two support members 71, and a plurality of flywheels (or rotating wheels or eccentric wheels or swivel wheel or swinging wheel) 74 arranged between the two support members 71. Each of the two support members 71 has a periphery provided with a plurality of wheel supports 72 pivotally connected with the flywheels 74 and has a center provided with a shaft hole 76 mounted on the rotation shaft 40. The shaft hole 76 has an inner diameter greater than an outer diameter of the rotation shaft 40. The wheel supports 72 extend radially and outwardly from the center of each of the two support members 71, and are arranged in a radiating manner. The flywheels 74 are arranged in an eccentric manner.

The first magnetic members 18 are arranged in an annular manner and distributed evenly and equally. The first magnetic members 18 are received in the first receiving groove 17. The second magnetic members 55 are arranged in an annular manner and distributed evenly and equally. Each of the second magnetic members 55 has a polarity the same as that of each of the first magnetic members 18 to produce a repulsive force between the second magnetic members 55 and the first magnetic members 18. The second magnetic members 55 are received in the second receiving grooves 54.

The third magnetic members 57 are arranged in an annular manner and distributed evenly and equally. The third magnetic members 57 are arranged between the second magnetic members 55. The third magnetic members 57 are received in the third receiving grooves 56. The fourth magnetic members 63 are arranged in an annular manner and distributed evenly and equally. Each of the fourth magnetic members 63 has a polarity the same as that of each of the third magnetic members 57 to produce a repulsive force between the fourth magnetic members 63 and the third magnetic members 57 when the magnetically floating seat 50 is rotated. The fourth magnetic members 63 are received in the fourth receiving grooves 62.

In the preferred embodiment of the present invention, a plurality of stands 12 are mounted on a bottom of the base 10. The base 10 is provided with a plurality of through holes 11 allowing passage of the stands 12, each of the stands 12 has an upper end provided with an axial screw hole 13, and a plurality of screws "P" extend through the through holes 11 of the base 10 and are screwed into the axial screw hole 13 of each of the stands 12.

In the preferred embodiment of the present invention, the base 10 is provided with a radial screw hole 14, the upright portion 21 of the cantilever 20 is provided with a radial through hole 24, and a screw "P" extends through the radial through hole 24 of the cantilever 20 and is screwed into the radial screw hole 14 of the base 10, to secure the upright portion 21 of the cantilever 20 to the base 10.

In the preferred embodiment of the present invention, the horizontal portion 22 of the cantilever 20 is provided with an upper counterbore 25 receiving the upper bearing B1. The base 10 has a center provided with a lower counterbore 15 receiving the bearing seat 30. The bearing seat 30 has a center provided with an axial hole 32 receiving the at least one lower bearing B2.

In the preferred embodiment of the present invention, two lower bearings B2 are provided and received in the axial hole 32 of the bearing seat 30.

In the preferred embodiment of the present invention, the lower counterbore 15 of the base 10 has a periphery provided with a plurality of axial screw holes 16, the bearing seat 30 has a periphery provided with a plurality of axial through holes 31, and a plurality of screws "P" extend through the axial through holes 31 of the bearing seat 30 and are screwed into axial screw holes 16 of the base 10, to secure the bearing seat 30 to the base 10.

In the preferred embodiment of the present invention, the cantilever 20 further includes a reinforcing portion 23 arranged between the upright portion 21 and the horizontal portion 22.

In the preferred embodiment of the present invention, a lower one of the two support members 71 is provided with a slot 78 (see FIG. 4) which is located under and connected to the shaft hole 76, and the magnetically floating seat 50 is provided with a projection 52 inserted into the slot 78 of the lower one of the two support members 71. The slot 78 of the lower one of the two support members 71 has an opening directed downward.

In the preferred embodiment of the present invention, a belt wheel 80 is mounted on the rotation shaft 40 and secured to an upper one of the two support members 71. The belt wheel 80 is provided with a belt 84 connected with a motor 90. Thus, the motor 90 drives the belt wheel 80 and the flywheel unit 70 to rotate synchronously.

In the preferred embodiment of the present invention, the upper one of the two support members 71 is provided with a slot 77 which is located above and connected to the shaft hole 76, and the belt wheel 80 is provided with a projection 82 (see FIG. 4) inserted into the slot 77 of the upper one of the two support members 71. The slot 77 of the upper one of the two support members 71 has an opening directed upward.

In the preferred embodiment of the present invention, the repulsion driver 60 includes a plurality of substantially L-shaped brackets 61, and the magnetically floating seat 50 is surrounded by the brackets 61. Each of the fourth receiving grooves 62 is formed in each of the brackets 61 and has an opening directed inwardly. The base 10 has a periphery provided with a plurality of axial screw holes 19, and a plurality of screws "P" extend through the brackets 61 and are screwed into axial screw holes 19 of the base 10, to secure the brackets 61 to the base 10.

In the preferred embodiment of the present invention, the upper end 41 of the rotation shaft 40 is provide with an upper threaded portion 43, and two nuts "N" are screwed onto the upper threaded portion 43 of the rotation shaft 40 and press the belt wheel 80. The lower end 42 of the rotation shaft 40 is provide with a lower threaded portion 44, and two nuts "N" are screwed onto the lower threaded portion 44 of the rotation shaft 40 and press the at least one lower bearing B2.

In the preferred embodiment of the present invention, each of the wheel supports 72 is provided with an axial through hole 73, each of the flywheels 74 is provided with an eccentric hole 75, and the flywheel unit 70 further includes a plurality of spindles "Q" extending through the axial through hole 73 of each of the wheel supports 72, and the eccentric hole 75 of each of the flywheels 74, such that the flywheels 74 are pivotally mounted on the spindles "Q".

In the preferred embodiment of the present invention, each of the two support members 71 provided with a plurality of axial screw holes 79. The magnetically floating seat 50 is provided with a plurality of axial through holes 53, and a plurality of screws "P" extend through the axial through holes 53 of the magnetically floating seat 50 and are screwed into the axial screw holes 79 of the lower one of the two support members 71, to secure the magnetically floating seat 50 to the lower one of the two support members 71 of the flywheel unit 70. The belt wheel 80 is provided with a plurality of axial through holes 83, and a plurality of screws "P" extend through the axial through holes 83 of the belt wheel 80 and are screwed into the axial screw holes 79 of the upper one of the two support members 71, to secure the belt wheel 80 to the upper one of the two support members 71 of the flywheel unit 70.

In the preferred embodiment of the present invention, the belt wheel 80 has a center provided with a shaft hole 81 mounted on and secured to the rotation shaft 40.

Figure 3:
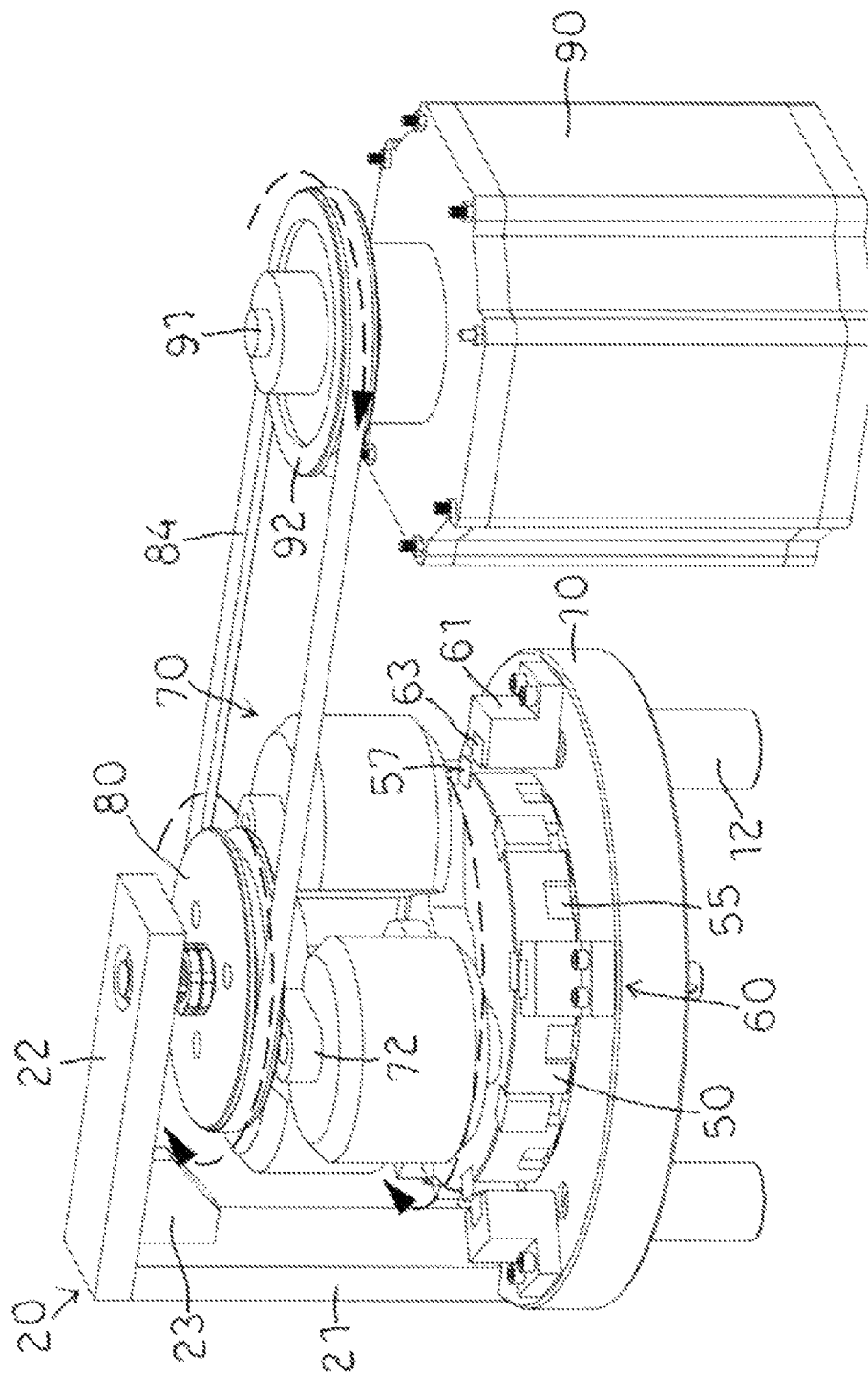
FIG. 3 is a perspective operational view of the flywheel device for a motor in accordance with the preferred embodiment of the present invention.
Figure 4:
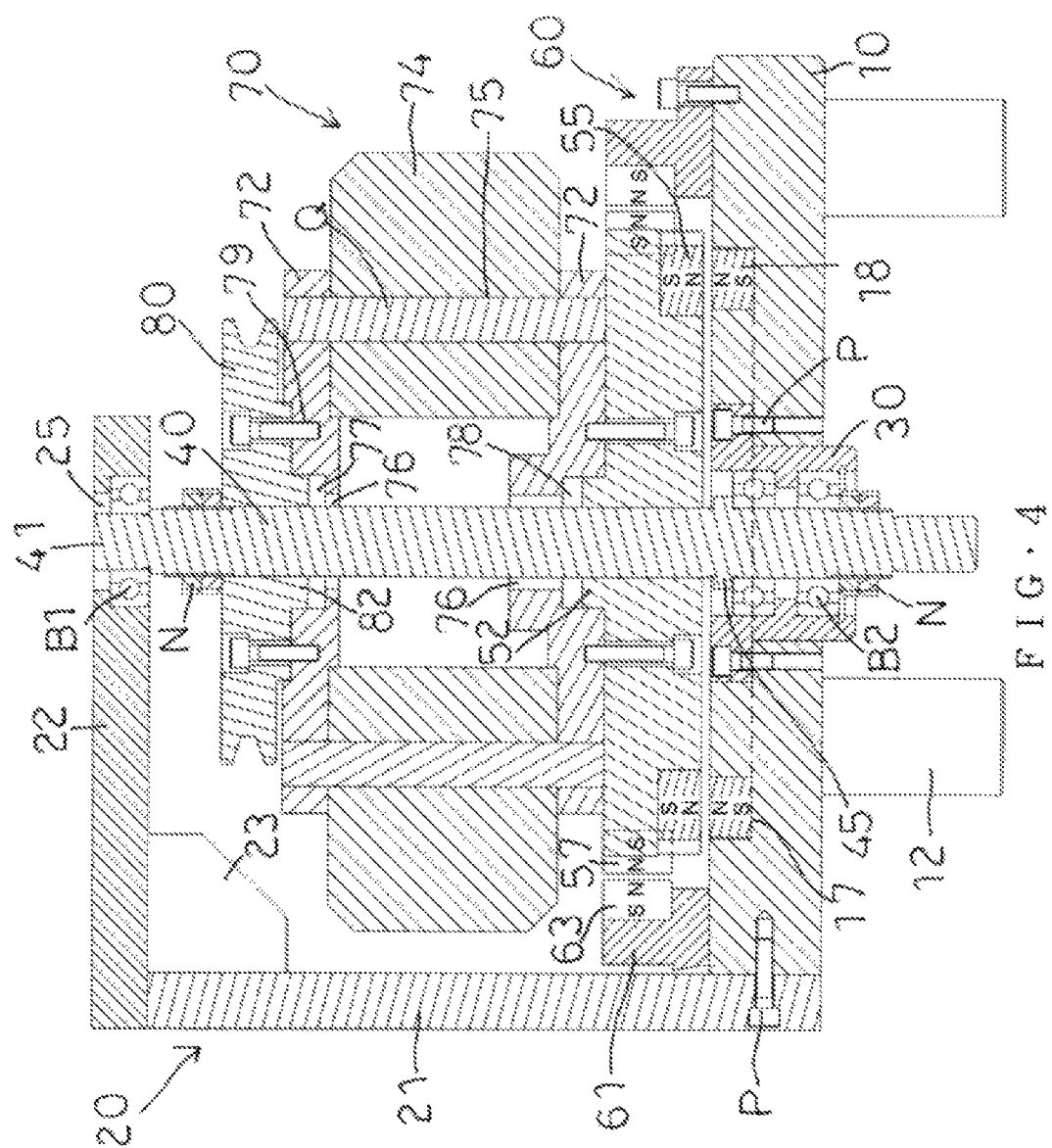
FIG. 4 is a cross-sectional view of the flywheel device as shown in FIG. 1.
Figure 5:
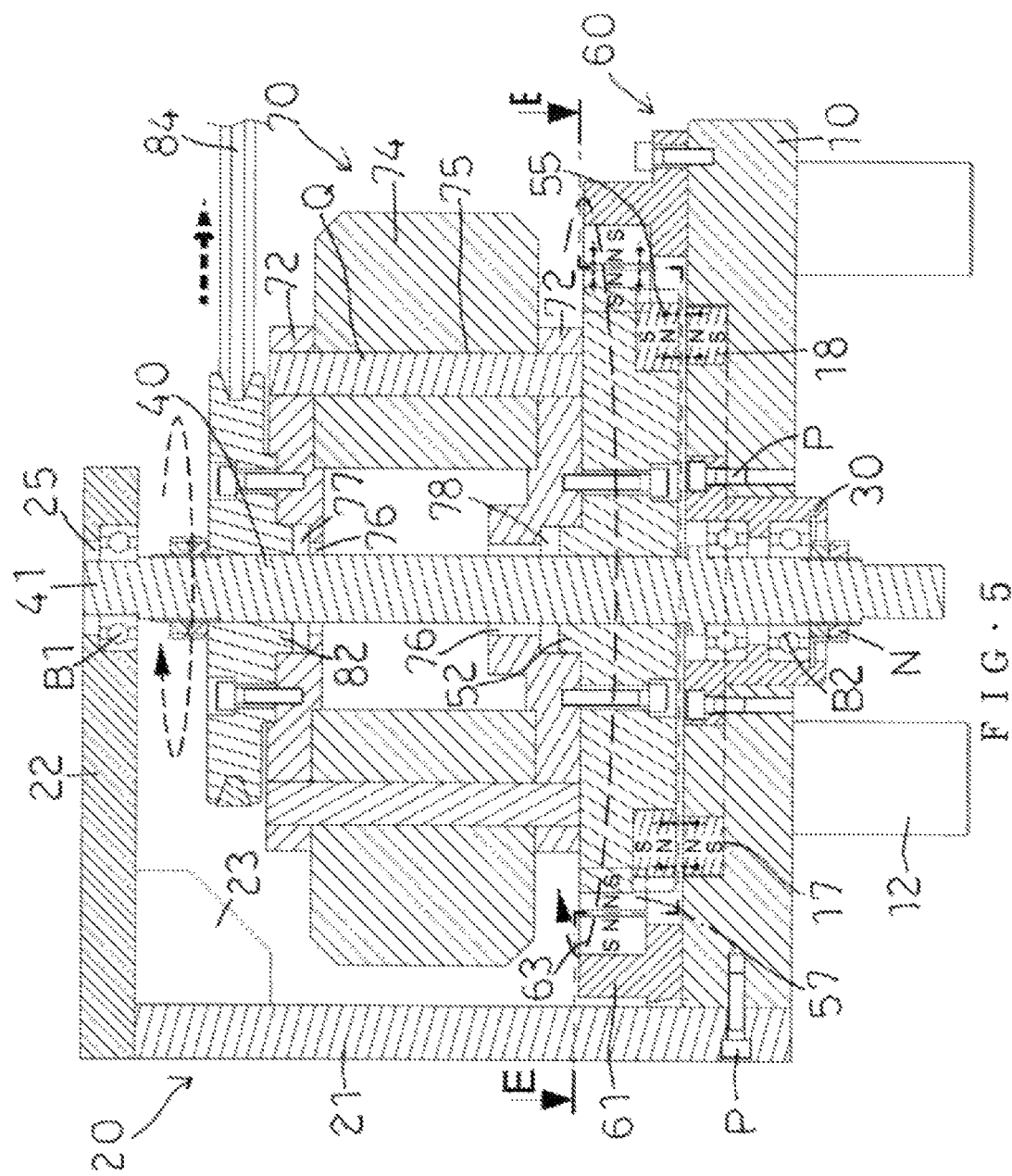
FIG. 5 is a schematic operational view of the flywheel device as shown in FIG. 4 in use.
Figure 6:
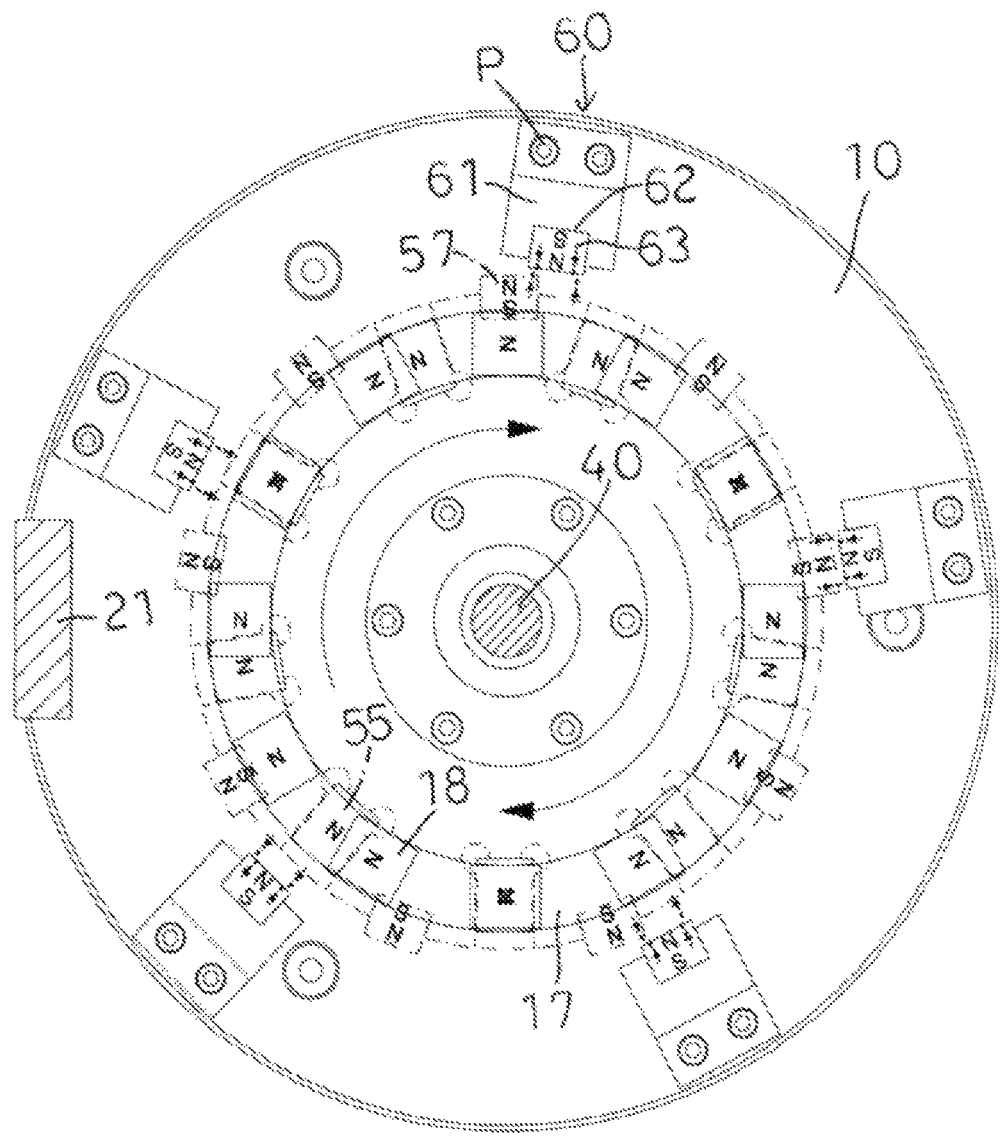
FIG. 6 is a cross-sectional view of the flywheel device taken along line E-E as shown in FIG. 5.
Figure 7:
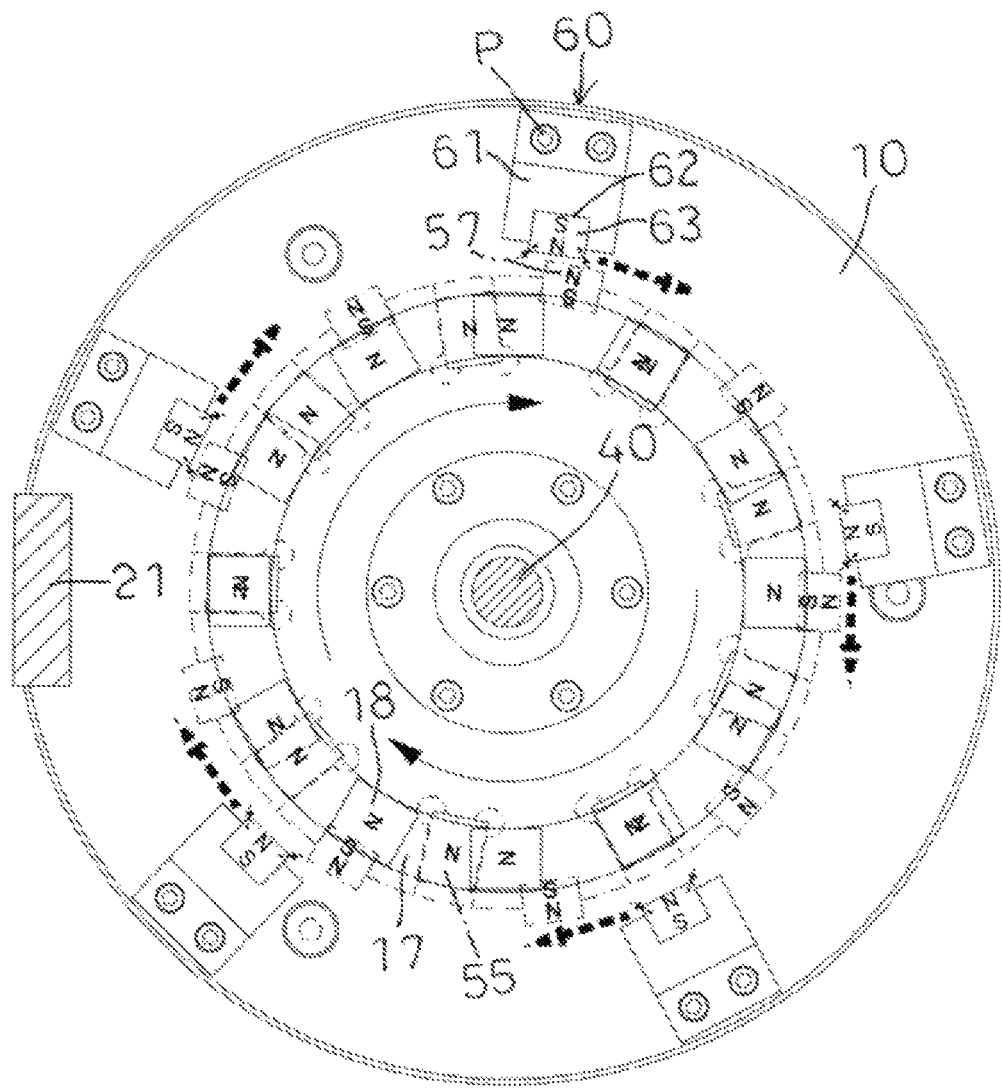
FIG. 7 is a schematic operational view showing the third magnetic members and the fourth magnetic members produce a repulsive force therebetween.

In the preferred embodiment of the present invention, the motor 90 is provided with a rotor 91 which is provided with a small belt wheel 92 which is connected with the belt 84. The rotor 91 of the motor 90 drives the small belt wheel 92 which drives the belt 84 which drives the belt wheel 80 which drives the flywheel unit 70, such that the belt wheel 80 and the flywheel unit 70 are rotated synchronously as shown in FIG. 3. Thus, the motor 90 provides an auxiliary power to drive and rotate the flywheel unit 70.

Figure 2:
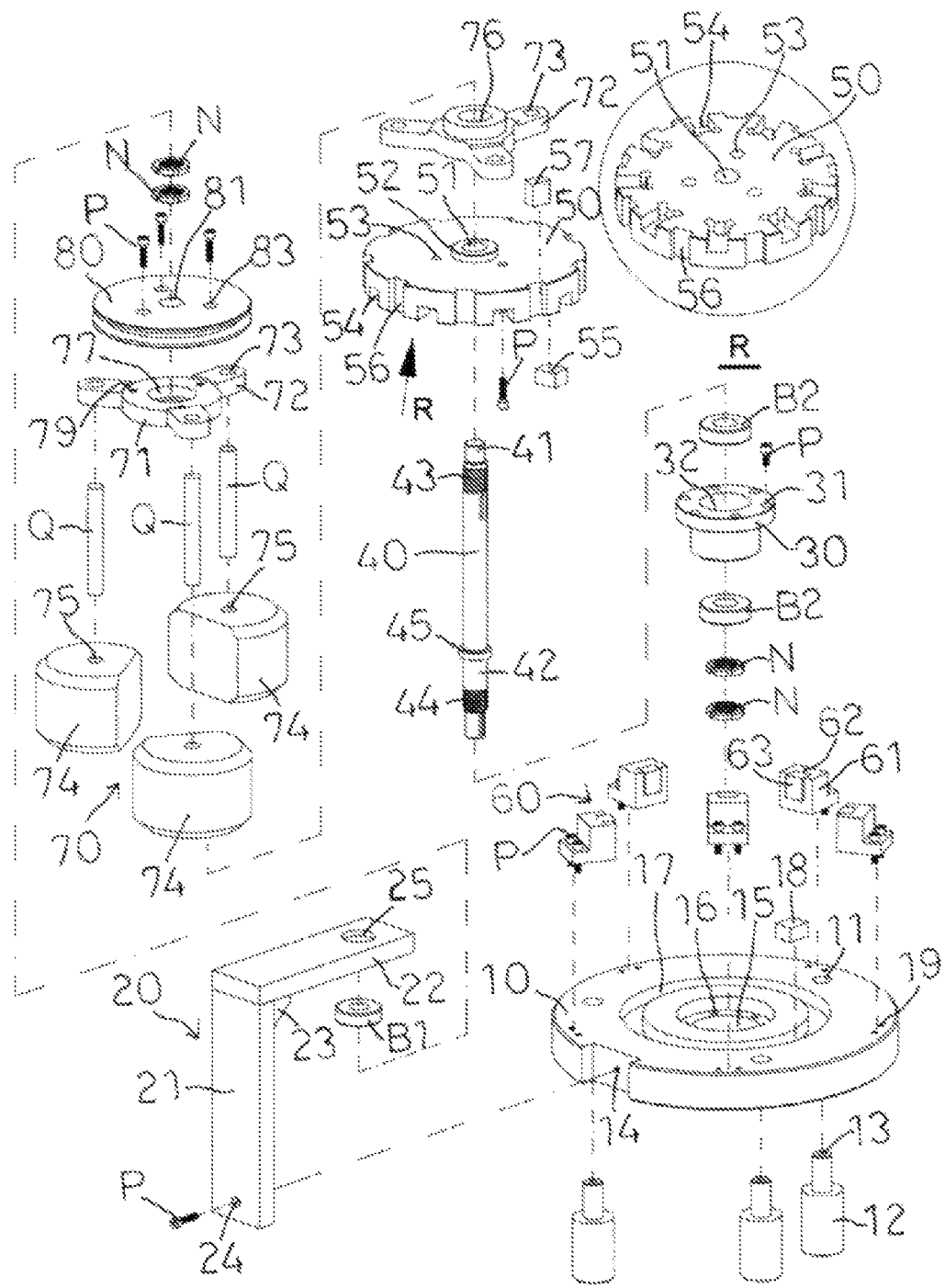
FIG. 2 is an exploded perspective view of the flywheel device in accordance with the preferred embodiment of the present invention.

In operation, referring to FIGS. 3-7 with reference to FIGS. 1 and 2, after the motor 90 is started, the rotor 91 drives the small belt wheel 92 which drives the belt 84 which drives the belt wheel 80 which drives and rotates the rotation shaft 40 synchronously. When the rotation shaft 40 is rotated, the flywheels 74 of the flywheel unit 70 are driven and rotated, so as to produce a torque by the rotational inertia of the flywheels 74. Thus, the flywheel unit 70 produces the required torque such that the flywheel device is available a working machine, such as a stamping machine, a press, an iron sheet cutter, a stone crusher and the like. At the same time, the magnetically floating seat 50 is mounted on the bottom of the flywheel unit 70, the first magnetic members 18 are mounted on the base 10, and the second magnetic members 55 are mounted on the magnetically floating seat 50 and correspond to the first magnetic members 18. Each of the second magnetic members 55 has a polarity the same as that of each of the first magnetic members 18 to produce a repulsive force between the second magnetic members 55 and the first magnetic members 18, such that when the magnetically floating seat 50 is rotated relative to the base 10, the repulsive force pushes the magnetically floating seat 50 upward, so as to produce a magnetically floating effect to the flywheel unit 70. In addition, the repulsion driver 60 surrounds the magnetically floating seat 50, the third magnetic members 57 are mounted on the magnetically floating seat 50, and the fourth magnetic members 63 are mounted on the repulsion driver 60 and correspond to the third magnetic members 57. Each of the fourth magnetic members 63 has a polarity the same as that of each of the third magnetic members 57 to produce a repulsive force between the fourth magnetic members 63 and the third magnetic members 57, such that when the magnetically floating seat 50 is rotated relative to the repulsion driver 60, the repulsion driver 60 produces a repulsive driving force on the magnetically floating seat 50. In the practical test, when the flywheel unit 70 is operated at 600 rpm, the consumed power of the motor 90 is 203 W. Thus, the consumed electricity required for driving the motor 90 is improved.

Accordingly, the flywheel unit 70 produces an upward magnetically floating repulsive force and a rotational repulsive force in a circumferential tangent direction, such that the flywheel device reduces the consumed electricity of the motor 90.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A flywheel device comprising:
   a base;
   a cantilever mounted on a side of the base;
   a bearing seat mounted on a center of the base;
   a plurality of first magnetic members mounted on a top of the base;
   a rotation shaft arranged between the cantilever and the bearing seat;
   a magnetically floating seat mounted on the rotation shaft;
   a plurality of second magnetic members mounted on a bottom of the magnetically floating seat and corresponding to the first magnetic members;
   a plurality of third magnetic members mounted on a periphery of the magnetically floating seat;
   a repulsion driver locked on a periphery of the base and surrounding the magnetically floating seat;
   a plurality of fourth magnetic members mounted on the repulsion driver and corresponding to the third magnetic members; and
   a flywheel unit mounted on the rotation shaft and located above the magnetically floating seat;
   wherein:
   the top of the base is provided with a first receiving groove;
   the cantilever includes an upright portion, and a horizontal portion;
   the upright portion of the cantilever is secured to the base;
   an upper bearing is mounted on the horizontal portion of the cantilever;
   at least one lower bearing is mounted on the bearing seat;
   the rotation shaft has an upper end pivotally mounted on the upper bearing and a lower end pivotally mounted on the at least one lower bearing;
   the rotation shaft is provided with a positioning flange;
   the magnetically floating seat is located above the positioning flange and spaced from the base, with a clearance being defined between the magnetically floating seat and the base;
   the magnetically floating seat has a center provided with a shaft hole mounted on the rotation shaft;
   the shaft hole has an inner diameter smaller than an outer diameter of the positioning flange, with the shaft hole of the magnetically floating seat being positioned above the positioning flange of the rotation shaft;
   the bottom of the magnetically floating seat is provided with a plurality of second receiving grooves;
   the periphery of the magnetically floating seat is provided with a plurality of third receiving grooves;
   the repulsion driver has a hollow interior receiving the magnetically floating seat;
   the repulsion driver is provided with a plurality of fourth receiving grooves;
   the flywheel unit includes two support members, and a plurality of flywheels arranged between the two support members;
   each of the two support members has a periphery provided with a plurality of wheel supports pivotally connected with the flywheels and has a center provided with a shaft hole mounted on the rotation shaft;
   the first magnetic members are received in the first receiving groove;

the second magnetic members are received in the second receiving grooves;
each of the second magnetic members has a polarity the same as that of each of the first magnetic members to produce a repulsive force between the second magnetic members and the first magnetic members;
the third magnetic members are received in the third receiving grooves;
the fourth magnetic members are received in the fourth receiving grooves; and
each of the fourth magnetic members has a polarity the same as that of each of the third magnetic members to produce a repulsive force between the fourth magnetic members and the third magnetic members when the magnetically floating seat is rotated.

2. The flywheel device as claimed in claim 1, wherein:
a plurality of stands are mounted on a bottom of the base;
the base is provided with a plurality of through holes allowing passage of the stands;
each of the stands has an upper end provided with an axial screw hole; and
a plurality of screws extend through the through holes of the base and are screwed into the axial screw hole of each of the stands.

3. The flywheel device as claimed in claim 1, wherein the base is provided with a radial screw hole, the upright portion of the cantilever is provided with a radial through hole, and a screw extends through the radial through hole of the cantilever and is screwed into the radial screw hole of the base, to secure the upright portion of the cantilever to the base.

4. The flywheel device as claimed in claim 1, wherein:
the horizontal portion of the cantilever is provided with an upper counterbore receiving the upper bearing;
the base has a center provided with a lower counterbore receiving the bearing seat; and
the bearing seat has a center provided with an axial hole receiving the at least one lower bearing.

5. The flywheel device as claimed in claim 1, wherein the cantilever further includes a reinforcing portion arranged between the upright portion and the horizontal portion.

6. The flywheel device as claimed in claim 1, wherein:
a lower one of the two support members is provided with a slot which is located under and connected to the shaft hole;
the magnetically floating seat is provided with a projection inserted into the slot of the lower one of the two support members; and
the slot of the lower one of the two support members has an opening directed downward.

7. The flywheel device as claimed in claim 1, wherein:
a belt wheel is mounted on the rotation shaft and secured to an upper one of the two support members;
the belt wheel is provided with a belt connected with a motor;
the motor drives the belt wheel and the flywheel unit to rotate synchronously.

8. The flywheel device as claimed in claim 7, wherein:
the upper one of the two support members is provided with a slot which is located above and connected to the shaft hole;
the belt wheel is provided with a projection inserted into the slot of the upper one of the two support members; and
the slot of the upper one of the two support members has an opening directed upward.

* * * * *